United States Patent [19]

Ngo

[11] Patent Number: 4,965,709
[45] Date of Patent: Oct. 23, 1990

[54] SWITCHING CONVERTER WITH PSEUDO-RESONANT DC LINK

[75] Inventor: Khai D. T. Ngo, Gainesville, Fla.

[73] Assignee: General Electric Company, Schenectady, N.Y.

[21] Appl. No.: 412,033

[22] Filed: Sep. 25, 1989

[51] Int. Cl.$^5$ .......................................... H02M 4/451
[52] U.S. Cl. ...................................... 363/37; 363/137; 318/803
[58] Field of Search ................. 363/35, 37, 51, 79, 363/96, 98, 132, 135, 136, 137, 138; 318/798, 799, 800, 801, 802, 803

[56] References Cited

U.S. PATENT DOCUMENTS

| | | | |
|---|---|---|---|
| 4,086,621 | 4/1978 | Vukasovic | 363/37 |
| 4,331,994 | 5/1982 | Wirth | 363/37 |
| 4,567,420 | 1/1986 | Beck | 318/803 |
| 4,652,985 | 3/1987 | Bougle | 363/37 |
| 4,730,242 | 3/1988 | Divan | 363/37 |
| 4,788,635 | 10/1988 | Heinrich | 363/35 |
| 4,833,584 | 5/1989 | Divan | 363/37 |
| 4,864,483 | 9/1989 | Divan | 363/37 |

Primary Examiner—Peter S. Wong
Attorney, Agent, or Firm—Marvin Snyder; James C. Davis, Jr.

[57] ABSTRACT

A pseudo-resonant DC link for coupling direct current from a DC source to an inverter includes a plurality of switches which are controlled so as to minimize switching loss in the DC link and in the inverter. The DC link includes a capacitor and an inductor coupled through controllable switches in a manner that momentarily reduces to zero the input voltage to the inverter each time that a switch in the inverter is commutated. The controllable switches in the DC link function to allow the capacitor to resonate through the inductor and then be recharged at the end of a commutation interval. The controllable switches in the DC link are timed to that switching generally occurs under conditions of zero current.

16 Claims, 4 Drawing Sheets

SWITCHING CONVERTER WITH PSEUDO-RESONANT DC LINK

The present invention relates to electrical power converters and, more particularly, to a method and apparatus for achieving low loss switching of power semiconductor devices in a voltage source inverter.

BACKGROUND OF THE INVENTION

Electrical power converter systems are widely used to convert fixed frequency alternating current (AC) power to variable frequency, variable amplitude power. In general, such systems include a rectifier for converting AC power to direct current (DC) power and an inverter for converting the DC power to variable frequency, variable amplitude AC power. The output AC power from the inverter may be pulse width modulated (PWM) or otherwise controlled by the inverter to establish a desired output power level. In such systems, a DC link transfers power from the rectifier to the inverter. The DC link may be merely an inductive coupler for transiently isolating the rectifier from the inverter.

Inverters may be of the current source type or the voltage source type. The voltage source inverter, such as the PWM inverter, is well known in the art and is used in motor drive applications as well as in voltage regulated frequency changer applications. The present invention is generally directed to voltage source inverters and is described in that context. However, both types of inverters employ a plurality of controlled semiconductor switching devices which are subject to switching losses and potential thermal failures for which the present invention provides a means of reducing.

One source of switching losses in electrical switching converters is attributable to the switching frequency of the converters. It is desirable to reduce the size and weight of electrical switching converters and one method of doing so is to increase the converter switching frequency. By increasing the switching frequency, the passive components such as inductors and capacitors operate at a higher frequency and hence can be made smaller, resulting in a converter of smaller size, lower weight, and faster response time. However, the higher frequency switching aggravates switching device losses and degrades efficiency of the converter.

The voltage source inverter utilizes semiconductor switches which must withstand both high voltage and high current during switching transients. Consequently, these switches suffer from high switching losses. Some attempts to reduce switching losses have involved employing passive snubber circuits, each connected to a respective one of the switching devices. This requires use of many added components which may themselves be lossy. Another proposed method employs a resonant DC link, but this method requires that the link switches withstand two times the DC input voltage and carry high voltage and current since the energy processed flows through these switches.

SUMMARY OF THE INVENTION

One object of the present invention is to provide an electric power conversion system using semiconductor switching devices which overcomes the disadvantages of the prior art systems set forth above.

Another object of the present invention is to provide an electric power conversion system with reduced power loss in its semiconductor switching devices.

Still another object of the present invention is to provide an electric power conversion system utilizing a pseudo-resonant DC link to reduce switching power losses.

In general, the invention comprises in one form an electric power conversion system having a pseudo-resonant DC link for coupling DC power to input terminals of an inverter. The output voltage of the pseudo-resonant DC link, which is also the input voltage of the inverter, exhibits a waveform that is essentially DC and that contains "resonant notches" of brief duration during which the inverter switches can commutate with low switching loss. The inverter includes a plurality of controllable switches adapted to provide regulated output power at the inverter output terminals. Each controllable switch of the inverter, respectively, has a diode respectively connected in anti-parallel therewith. The DC link is "pseudo-resonant" since the waveform generated thereby is mostly DC but with short resonant intervals during which the waveform resonates from the DC level down to zero and then back up to the original DC level, so as to couple DC input power to input terminals of the inverter. The DC link comprises a first controllable switching means serially connected between the DC input power source and the input terminals of the inverter for selectively coupling DC input power to the inverter. A capacitor coupled across the input terminals of the inverter is charged to the voltage of the DC input power source when the first controllable switching means is in conduction. An inductor is connected by a first terminal to the junction between the capacitor and the first switching means, while a second switching means is connected between a second terminal of the inductor and the negative terminal of the DC input power source. The inductor serves to discharge the capacitor to zero voltage or to charge the capacitor to the DC input voltage. A third switching means is connected between the positive terminal of the DC input power source and the second terminal of the inductor.

A gating control means is provided for supplying turn-on and turn-off gate control signals to the semiconductor switching devices in the inverter and to the switching means in the DC link. This control means is operable to gate the first switching means out of conduction prior to providing a gating signal to any of the switching devices in the inverter to change the conductive state of any of those devices. This action gates the first switching means out of conduction when the voltage thereacross is essentially zero since the capacitor voltage is the same as the DC input voltage, thus assuring low-loss switching of the first switching means.

After the first switching means has ceased conduction, the control means then provides a signal to the second switching means to gate it into conduction. Because the inductor is connected in series with the second switching means, the second switching means changes conductive state at essentially zero current and therefore also undergoes relatively low switching loss. With the second switching means in conduction, the capacitor discharges through the inductor, causing the DC voltage at the inverter input terminals to drop to essentially zero and be clamped at this voltage by the inverter diodes. At this time, gating signals can be applied to the semiconductor switches in the inverter, allowing those switches to change conductive state at essentially zero voltage and therefore at very low loss.

After the voltage across the capacitor reaches zero, the second controllable switching means is turned off even though it may be passing relatively high current due to the inductive action of the series connected inductor. However, the second controllable switching means can be pulse operated so that it is relatively fast and consequently has a low power loss.

A unidirectional conducting means is connected in anti-parallel with the third switching means. After the second switching means has been turned off, the unidirectional conducting means provides a current path to allow the current in the inductor to decay linearly while the inductive energy is returned to the input power source. At a selected time after current ceases to flow in the unidirectional conducting means, the third switching means can be gated into conduction. Since the current in the third switching means is limited by the inductor to zero at initial turn-on, switching occurs without any substantial loss. With the third switching means in conduction, current in the inductor is forced to reverse direction because the power supply voltage exceeds the capacitor voltage. The current in the third switching means and the inductor recharges the capacitor. As the voltage across the capacitor increases with a tendency to exceed the input voltage, it is clamped at the input level by a diode connected in anti-parallel with the first switching means. After conditions stabilize, the first controllable switching means can be again gated into conduction at essentially zero voltage and low switching loss, and the third switching means is switched out of conduction.

The instant invention also contemplates a method of operating a DC to AC converter with low switching losses in which the converter includes an inverter with a plurality of switching devices. In this method, the switching devices are selectively gated into and out of conduction at predetermined times for converting the applied DC voltage to an AC voltage. The method comprises the steps of anticipating each of the predetermined times at which the switching devices in the inverter are switched into and out of conduction and momentarily reducing the DC voltage at the inverter input terminals to zero during the determined switching times. The method further includes changing the state of the switching devices at substantially zero applied voltage to minimize losses in the switching devices.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

DETAILED DESCRIPTION OF THE PREFERRED EMBODIMENT

Figure 1:
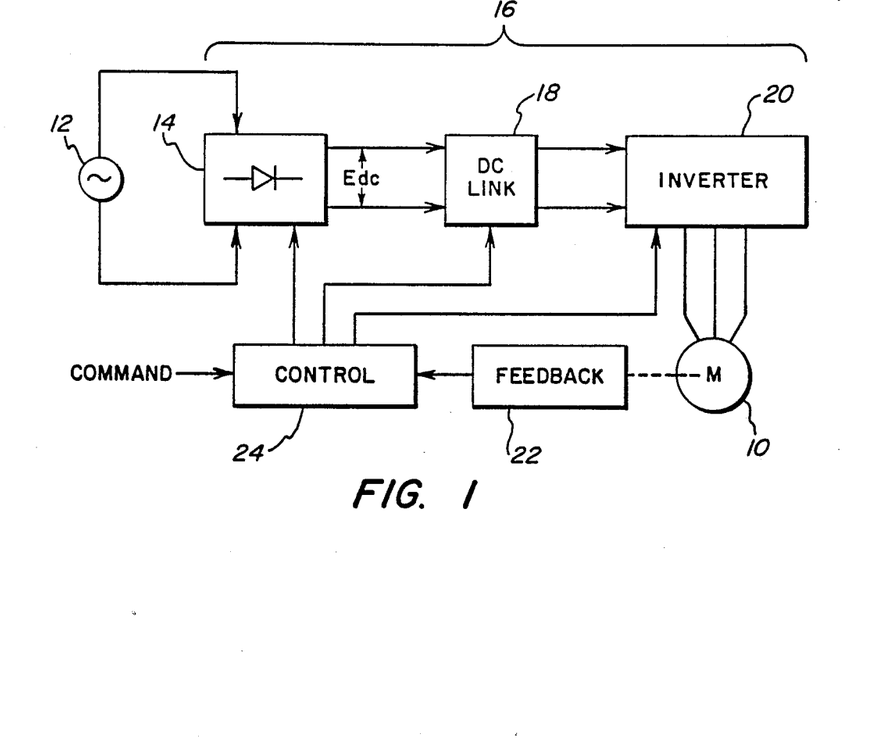
FIG. 1 is a simplified block diagram of a motor control circuit employing a power conversion system of the type including a DC to AC inverter.

FIG. 1 is a simplified block diagram of a motor control system incorporating a power conversion system for converting fixed frequency alternating current (AC) power to variable frequency, variable amplitude alternating current power for delivery to a motor 10. A power source 12, which may be, for example, a commercial utility power source, provides fixed frequency, constant voltage alternating current power to a rectifier circuit 14 forming the first element in an AC to AC conversion system 16. Circuit 14 may be a static rectifier circuit or may be a controlled rectifier circuit using gate controlled semiconductor switching devices for establishing a regulated direct current (DC) output voltage. The DC power developed by rectifier circuit 14 is coupled by a DC link 18 to an inverter 20. DC link 18, in common practice, comprises an inductor and capacitor, i.e., passive components, which serve to isolate the transient effects of switching in the inverter from the transient effects of switching in rectifier circuit 14. DC link 18 couples the DC power to input terminals of inverter 20. Within inverter 20, a plurality of semiconductor switching devices are provided for converting the DC input power to pulses or to alternating current power of variable frequency and variable amplitude for application to motor 10. The motor may be controlled either to produce a commanded torque output or a commanded speed output or may be controlled in response to some other known variable. A feedback circuit 22 monitors a selected variable such as motor speed or current and provides a feedback signal to a control circuit 24. The control circuit may include a microcomputer or other suitable apparatus for responding to an input command signal and to the feedback signal from feedback circuit 22 to provide gating signals to the inverter to control the frequency and power output from the inverter in a manner to minimize any difference between the feedback signal and the command signal. The control circuit may also supply gating signals to rectifier circuit 14 if the rectifier circuit includes controllable switching devices. Furthermore, if there are switching devices in the DC link, the control circuit may similarly supply gating signals to the DC link.

Figure 2:
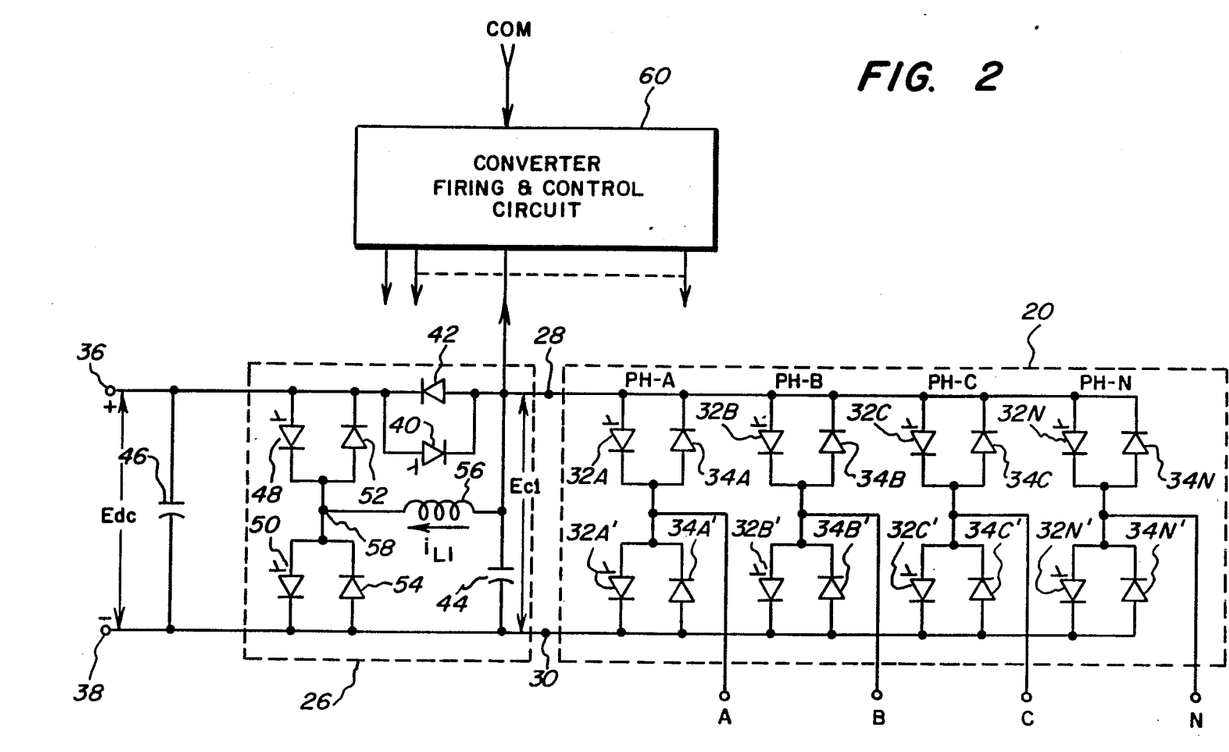
FIG. 2 is a simplified schematic diagram of a power conversion system including an inverter and a pseudo-resonant DC link in accordance with the present invention.

FIG. 2 is a schematic illustration of a pseudo-resonant DC link 26, in accordance with the present invention, for coupling a DC source voltage Edc to first and second input terminals 28, 30 of inverter circuit 20. The inverter circuit includes a plurality of gate controlled switching devices in four parallel-connected phase legs PH-A, PH-B, PH-C and PH-N. The inverter circuitry for each phase leg is identical. The PH-A leg, for example, includes first and second switching devices 32A and 32A' serially connected in the forward direction between the positive and negative DC input terminals 28 and 30. A terminal A connected to a point intermediate of switching devices 32A, 32A' provides an output voltage from phase leg PH-A. Connected in reverse parallel arrangement with each of the switching devices, respectively, are first and second flyback diodes 34A and 34A', respectively. The circuitry for each of the other phase legs is arranged identically to that of phase A and will not be detailed herein. The manner of operating an inverter such as inverter 20 for controlling a motor or for producing a variable frequency output voltage at output terminals A, B, C and N is well known, and a complete description thereof may be had by reference, for example, to U.S. Pat. No. 4,051,418. While this latter patent does not disclose the circuit of inverter 20 per se, it does describe a method for controlling an inverter circuit to regulate a desired output power. It will be noted that switching devices 32 of the inverter are illustrated as being metal oxide semiconductor controlled thyristors (MCTs). However, other types of controlled switches, e.g., thyristors or transistors, may be used in the inverter in a manner well known in the art. Typically, for such inverter, it is preferred that devices 32 be gate turn-off devices so that the inverter may be operated at high frequencies without the necessity of providing additional circuitry for commutating each of the switching devices. MCTs are preferred switching devices for the inverter and for the DC link circuit because of their advantageous electrical characteristics. A detailed description of such MCTs may be had by reference to U.S. Pat. Nos. 4,646,117; and 4,816,892, both of which are assigned to the instant assignee.

DC power is applied to first and second input terminals 36 and 38 of pseudo-resonant DC link 26. Terminal 36 is connected through a switching device 40 to input terminal 28 of the inverter, while second input terminal 38 is connected directly to input terminal 30 of the inverter. A diode 42 is connected in parallel opposition with switching device 40. Connected across input terminals 28 and 30 of inverter 20 is a first capacitor 44 across which is developed a quasi-resonant DC input voltage Ec1 for inverter 20. A second filter capacitor 46 is connected between input terminals 36 and 38. A pair of switching devices 48 and 50 are serially connected in parallel with filter capacitor 46. A diode 52 is connected in parallel opposition with switching device 48 and another diode 54 is connected in parallel opposition with switching device 50. An inductor 56 is connected between input terminal 28 of inverter 20 and a junction 58 of switching devices 48 and 50.

Figure 3:
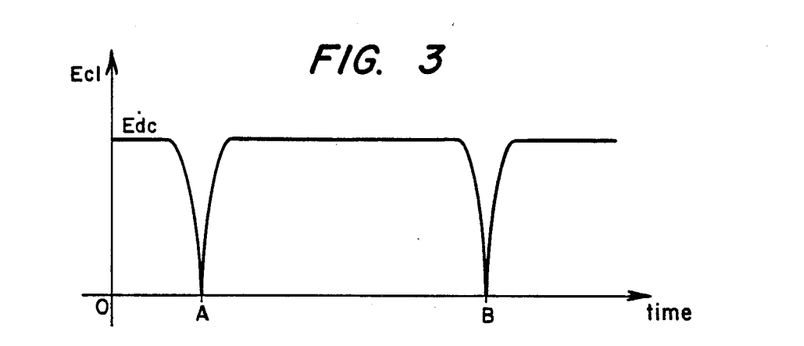
FIG. 3 is an illustrative diagram of a voltage waveform appearing at the input terminals of the inverter of FIG. 2 as a result of the action of the DC link of the present invention.

The output voltage produced by pseudo-resonant DC link 26 is the voltage Ec1 developed across capacitor 44 and is pseudo-resonant because the waveform is essentially DC except for brief intervals during which it resonates down to zero, as shown in FIG. 3. Accordingly, switching devices 32 of the inverter do not have to withstand twice the DC source voltage as they would if a conventional resonant DC link were employed. This voltage is generated by operation of switching devices 40, 48, and 50 in conjunction with current in diodes 42, 52 and 54. If the inverter is operated at a sufficiently high frequency, the capacitance of the switching devices themselves can make up the capacitance required for capacitor 44. At a lower frequency, a very small discrete capacitor 44 is needed for the DC link to function properly. All of the switching devices 32, 40, 48 and 50 are controlled from a converter firing and control circuit 60, equivalent to the control 24 of FIG. 1, which provides gating signals to gate each of the switching devices into and out of conduction. As previously mentioned, it is preferred that the switching devices comprise MCTs which are gated into conduction by application of a gating signal and gated out of conduction by removal of the gating signal. The design of a converter firing and control circuit is well known in the art as may be determined by reference to the aforementioned U.S. Pat. No. 4,051,418 or to U.S. Pat. Nos. 3,593,083 or 4,023,083, the latter patent being assigned to the instant assignee.

To understand operation of the pseudo-resonant DC link shown in FIG. 2, it must first be noted that when one of switching devices 32 within inverter 20 needs to be commutated, switching device 40 is turned off, allowing the voltage Ec1 across capacitor 44 to resonate down to zero and stay at zero volts as briefly as it takes to turn off one or more of the switching devices and turn on another. The switching losses in devices 32 within inverter 20 and in the devices within DC link 26 are low since there is practically zero voltage across the switches during commutation. Reliability of the entire circuit is thus enhanced since shoot-through faults caused by commutation under high voltage conditions are avoided.

Assuming that switching devices 32A, 32B and 32C' are carrying load currents and that switching device 40 is also conducting, voltage Ec1 is substantially the same as input source voltage Edc since capacitor 44 is charged to the level of voltage Edc across filter capacitor 46. If it is now desired to gate switching device 32A out of conduction and to gate device 32A' into conduction, the first step is to gate thyristor 40 out of conduction. Although thyristor 40 may be carrying current, the voltage drop across the thyristor is essentially zero since the voltage on capacitor 44 is substantially the same as the voltage on capacitor 46. Accordingly, thyristor 40 can be gated out of conduction with very low switching loss. Voltage Ec1 across capacitor 44 momentarily drops to substantially zero during commutation, as indicated in FIG. 3 at point A, and thereafter rises rapidly back to the level of Edc. A second commutation interval is shown in FIG. 3 at point B.

Figure 4A:
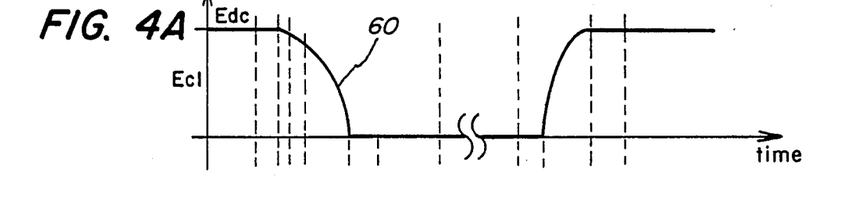
FIGS. 4A and 4B are a more detailed expansion of the interval within which a portion of the voltage waveform of FIG. 3 occurs, showing, in particular, a commutation interval.
Figure 4B:
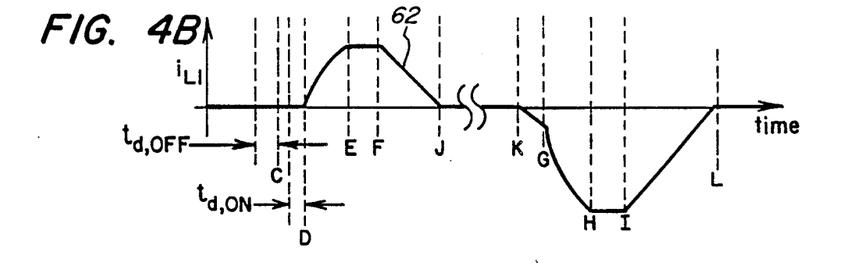

A more detailed and expanded view of commutation interval A of FIG. 3 is shown in FIGS. 4A and 4B wherein waveform 60 of FIG. 4A represents voltage $E_{c1}$ and waveform 62 of FIG. 4B represents current $i_{L1}$ through inductor 56. At the instant of time C, which is delayed from the time at which device 40 receives a turn-off signal at its gate by the turn-off interval $t_{d,OFF}$, device 40 stops conducting. The voltage across capacitor 44 is then discharged almost linearly by the load currents in devices 32A and 32B. This linear discharge continues until time D when thyristor 50, having received a turn-on signal at its gate at a turn-on interval $t_{d,ON}$ prior to time D, comes into conduction to quickly resonate capacitor 44 down to zero volts by discharge through inductor 56. Since conduction of any thyristor of the DC link actually stops only after a turn-off delay $t_{d,OFF}$ following the gate turn-off pulse applied thereto, and actually starts only after a turn-on delay $t_{d,ON}$ following the gate turn-on pulse applied thereto, the turn-on gate signal for device 50 should be delayed from the turn-off gate signal for device 40 by a time interval of at least $(t_{d,OFF} - t_{d,ON})$. Alternatively and more generally, a control circuit can be used to detect when voltage Ec1 starts decreasing and to turn on device 50 subsequently. A method and apparatus for sensing voltage and current or for providing control signals as a function of time in a switching converter circuit is described in commonly assigned U.S. Patent Application Ser. No. 187,611 filed Apr. 28, 1988 and entitled "Full-Bridge Lossless Switching Converter", the disclosure of which is hereby incorporated by reference. Turn-on of switching device 50 occurs with very low loss, since the voltage thereupon induced across inductor 56 limits the initial current in device 50 to a value close to zero. Voltage Ec1 across capacitor 44 is held at zero volts by the conduction of diodes 34 in the inverter for the interval from time E to time G. While voltage Ec1 is at zero, commutation of switching devices 32 can occur with essentially zero voltage applied to the inverter.

Once the voltage across capacitor 44 has dropped to essentially zero, the thyristor or switching device 50 can be gated out of conduction. Preferably, switching device 50 is gated out of conduction immediately after voltage Ec1 reaches zero. Thus, the circuit that senses voltage Ec1 can be used to detect when it reaches zero and to turn off device 50 subsequently. Alternatively, since voltage Ec1 requires a time of approximately $$\frac{\pi\sqrt{LC}}{2},$$

a quarter of a resonant cycle, to reach zero, device 50 may be gated off following a time interval of $$\left(t_{d,ON} + \frac{\pi\sqrt{LC}}{2}\right)$$

having been gated on. As shown in FIG. 4B, device 50 comes out of conduction at time F. Since device 50 is rated for pulses of current, it can be fabricated in a small physical size and be fast-acting so that any losses in the device will be low even though it is turned off while carrying relatively high current as shown in FIG. 4B. When device 50 becomes nonconductive, the current in inductor 56 is transferred to diode 52. The current in inductor 56 decays linearly from time F to time J, as shown in FIG. 4B. Between times J and K, the inductor current is zero. The interval JK is as long as it takes to commutate devices 32, and can be selected to be much longer than interval CJ.

At time K, switching device 48 turns on to begin changing the voltage on capacitor 44 from zero to Edc. Device 48 is turned on at very low loss due to current $i_{L1}$ being substantially zero at the time this switching occurs. At time G, when current $i_{L1}$ in switching device 48 and inductor 56 becomes greater than the current to be supplied by terminal 28 (of inverter 20) to the load, capacitor 44 begins resonating back or being charged back to the voltage Edc. Voltage Ec1 across capacitor 44 is clamped to voltage Edc by diode 42 which becomes forward biased if the voltage across capacitor 44 should tend to exceed the voltage across terminals 36 and 38.

Device 40 can be gated into conduction by sensing voltage Ec1 and supplying the gate signal when it reaches the value Edc, or by supplying the gate signal after a time $$\left(t_{d,ON} + \frac{L(\text{maximum load current})}{Edc} + \frac{\pi\sqrt{LC}}{2}\right)$$

following the gating on of device 48. The gating on of thyristor or switching device 40 can thus be achieved with very low switching loss since there is essentially zero voltage across the thyristor with diode 42 in conduction.

Device 48 is gated off at the same time that device 40 is gated on. After device 48 stops conducting, the energy contained within inductor 56 is returned to the input source by conduction through diode 54. At this juncture, the circuit has returned to its initialized condition and is ready for another commutation interval.

As mentioned above, the losses in switching device 50 may be low even though the device is commutated at high current levels. However, if it is desired to avoid even those low losses, the embodiment of the invention illustrated in FIG. 5 may be utilized. In this embodiment, the switching device pairs 48 and 50 and diode pairs 52 and 54 are connected in a series circuit with inductor 56 while capacitor 46 has been split into two equal sections 46A and 46B. Unlike devices 48 and 50 in the circuit of FIG. 2, devices 48 and 50 in the circuit of FIG. 5 are free from "shoot-through" fault since they are in series opposition and in series with inductor 56.

Figure 5:
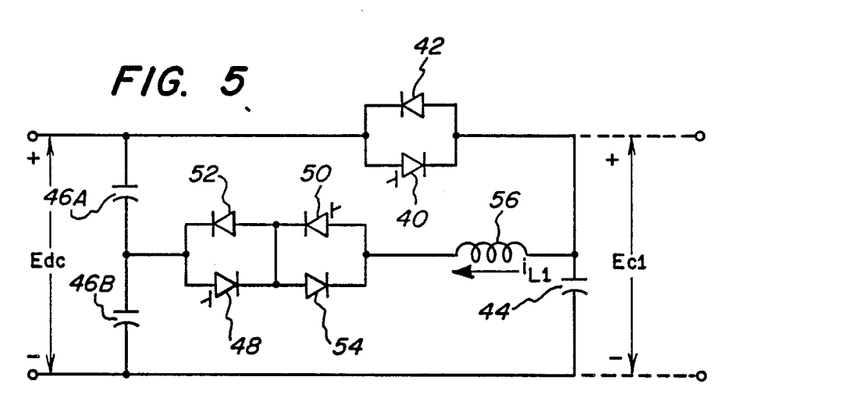
FIG. 5 is an alternative embodiment of a DC link in accordance with the teaching of the present invention.
Figure 6:
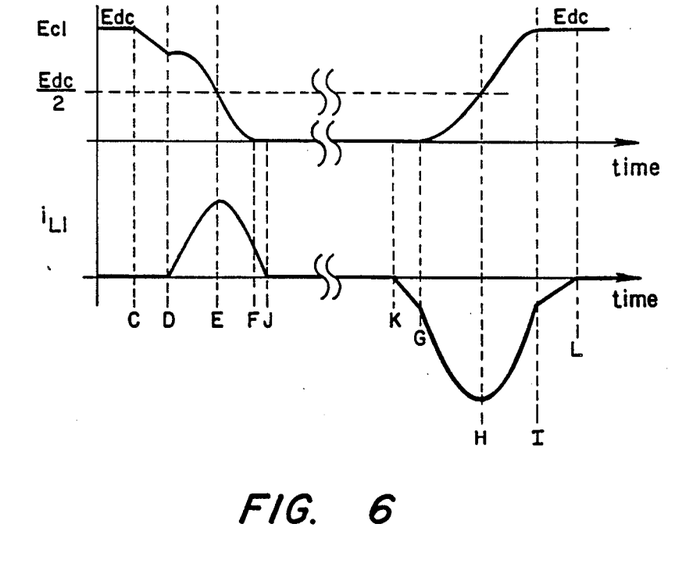
FIG. 6 is a diagram of a detailed waveform for a commutation interval occurring during operation of the DC link of FIG. 5.

The following description briefly outlines the sequence of events occurring in operation of the circuit of FIG. 5 with reference to the voltage and current waveforms illustrated in FIG. 6. For purposes of comparison, the event points on the waveforms in FIG. 6 are identified with the same letters as the corresponding event points in FIG. 4. Starting with event point C, thyristor 40 is gated out of conduction and the voltage Ec1 begins to decay. At event point D, thyristor 50 begins to conduct, allowing the voltage across capacitor 44 to quickly resonate down to zero volts by discharge through inductor 56. Between event times D and E, capacitor Ec1 resonates down to approximately Edc/2 while current $i_{L1}$ in inductor 56 reaches its peak value when conducted in devices 50 and 52. Between event times E and F, voltage Ec1 continues to resonate down to its zero value where it is clamped by the diodes in inverter circuit 20, shown in FIG. 2. Between event times F and J, current $i_{L1}$ conducted in device 50 and diode 52, continues to decay linearly. Between event times J and K, the gating signal is removed from device 50 allowing the device to be commutated naturally by absence of current flow. Because device 50 is thus both turned on and turned off under conditions of zero current, its switching is essentially lossless. Device 50 may be gated off, or have its gating signal removed, at a calculated time interval after having been gated into conduction. This time interval can be calculated as $(\pi+1)\sqrt{LC} + t_{d,ON}$, where the time interval between events D and F is less than $\pi \times \sqrt{LC}$, the time interval between events F and J is less than $\sqrt{LC}$, and the time interval between events D and J is less than $(\pi+1) \times \sqrt{LC}$. In this relationship, L and C represent the inductance of inductor 56 and the capacitance of capacitor 44, respectively.

The time interval between events J and K is selected to be as long as is necessary for commutating devices 32 within inverter 20, shown in FIG. 2. At event time K, device 48 begins conduction, allowing current conducted by device 48 and diode 54 to begin to recharge capacitor 44 through inductor 56. Device 48 conducts essentially zero current at turn-on due to the inductance of inductor 56. The turn-on gating signal to device 48 is applied at a time interval $t_{d,ON}$ prior to event time K. Between event times K and G, the current is essentially linear and is supplied through inductor 56 to inverter 20 (shown in FIG. 2) without any significant recharging of capacitor 44. At time G, the current has increased to a level at which capacitor 44 begins to recharge. The recharge continues essentially until event time I, while the maximum inductor current occurs at event time H, which is when the voltage on capacitor 44 is essentially Edc/2. At event time I, voltage Ec1 has reached essentially the value of voltage Edc and device 42 is forward biased. Switching device 40 may then be turned on by sensing either voltage Ec1 or by applying an appropriate gating pulse to device 40. Between event times I and L, current in inductor L linearly decays until it reaches approximately zero, at which time device 48 is turned off. Device 48 can be controlled either in accordance with sensed current or by being actuated at a predetermined time interval after turn-on. The turn-off time interval for device 48 can be selected to be equal to its turn-on delay interval $t_{d,ON}$ plus the time interval between events K and L on the graph of FIG. 6. The time interval between events K and L can be computed by recognizing that the time interval between events K and G is equal to twice the inductance times the maximum load current divided by the voltage Edc, the time interval between events G and I is less than $\pi \times \sqrt{LC}$, while the time interval between events I and L is equal to the time between events K and G and is less than the time interval between events H and G multiplied by $\sqrt{LC}$. It will be recognized by those skilled in the art that $\pi \times \sqrt{LC}$ is one-half of a resonant period.

The advantage of the system of FIG. 5, as mentioned above, is that devices 48 and 50 may be switched under essentially zero current conditions. This assures that the devices have minimum losses during switching. As described above, the timing of the switching of these devices may be had by computing the appropriate time intervals from the known characteristics and values of inductor 56 and capacitor 44. Alternatively, the circuits of FIGS. 2 and 5 could include devices to detect current levels and provide appropriate signals to converter firing and control circuit 60, shown in FIG. 2, for supplying gating signals to the switching devices at appropriate times. The aforementioned U.S. Patent Application Ser. No. 187,611 describes in more detail a method for controlling the switches either by timing or by voltage or current sensing.

While the invention has been described in what is considered to be preferred embodiments, it will be appreciated that other modifications, variations and changes may be made without departing from the spirit and scope of the invention. Accordingly, it is intended that the claims not be limited to the illustrative embodiment but be given an interpretation commensurate with the scope thereof.

What is claimed is

1. A DC to AC converter including an inverter having input terminals and a plurality of controllable switches coupled to said input terminals and adapted to provide regulated output power, and a DC link for coupling a source of DC input power to said inverter, the converter comprising:

first controllable switching means in the DC link for selectively coupling DC input power to the inverter input terminals;

capacitance means coupled to the inverter input terminals in a manner to be charged to the voltage of the DC input power when said first controllable switching means is in conduction;

second controllable switching means;

inductive means serially coupled to said second controllable switching means, the series combination of said second switching means and said inductor being connected in a current discharge path with said capacitance means for establishing a pseudo-resonant discharge of said capacitance means; and control means for providing gating signals to each of the plurality of controllable switches in the inverter and to said first and second controllable switching means, said control means gating said first controllable switching means out of conduction immediately prior to each time a gating signal is applied to one or more of the controllable switches in said inverter, said control means further gating said second controllable switching means into conduction after gating said first controllable switching means out of conduction and before changing any gating signals to said inverter to force a discharge of said capacitance means and remove input power to said inverter during switching of said controllable switches of said inverter.

2. The converter of claim 1 including third controllable switching means for selectively coupling the DC input power source to a junction intermediate said second controllable switching means and said inductive means, said third controllable switching means being poled to conduct current in said inductive means to said capacitance means for recharging said capacitance means to a voltage level substantially equal to that of the DC input power source after commutation of said controllable switches in said inverter.

3. The converter of claim 2 including a diode connected in parallel with said third controllable switching means and poled to conduct current in a direction opposite to current in said third controllable switching means, said control means being operable to gate said second controllable switching means out of conduction while current follows a path from said capacitance means through said inductive means such that said current transfers to said diode, said control means thereafter gating said third controllable switching means into conduction while said diode conducts current so as to effect substantially zero voltage switching of said third controllable switching means.

4. The converter of claim 3 including a second diode connected in parallel with said first controllable switch means and poled to conduct current in a direction opposite to current in said first controllable switching means, said first controllable switching means being gated into conduction when voltage on said capacitance means is substantially equal to the voltage of said DC input power source.

5. The converter of claim 1 including third controllable switching means for selectively coupling DC input power into said current discharge path for effecting a pseudo-resonant reverse current through said inductive means for recharging said capacitance means to a voltage level substantially equal to that of the DC input power source after commutation of said controllable switches in said inverter.

6. The converter of claim 5 wherein said second controllable switching means is connected in series electrical circuit with said third controllable switching means and said switching means are poled to conduct current in opposite directions with respect to each other, said converter including first and second diodes connected, respectively, in parallel circuit arrangement with corresponding ones of said first and second controllable switching means, each of said diodes being poled to conduct current in an opposite direction with respect to current through a corresponding one of said first and second switching means.

7. The converter of claim 6 including first and second capacitors serially connected in parallel with the source of DC input power for developing a voltage intermediate the voltage of the source at a junction therebetween, said series combination of said first and second controllable switching means being connected between said junction and said inductive means.

8. A method of operating a DC to AC converter with low switching loss, said converter including an inverter having plural switching devices for being selectively gated into and out of conduction at predetermined times so as to convert an applied DC voltage to an AC voltage, and a DC link, said method comprising the steps of:
producing a substantially unvarying DC voltage at the output of said DC link;
anticipating each of the predetermined times at which said switching devices in said inverter are to be switched and out of conduction;
momentarily interrupting the substantially unvarying DC voltage produced by said DC link during the predetermined switching times; and
changing the state of the switching devices while the DC voltage produced by said DC link is momentarily interrupted.

9. A DC link for applying a DC voltage to a switching inverter, said inverter having first and second input terminals and including a plurality of controllable switching devices for selectively applying the DC voltage to predetermined output terminals of the inverter, said DC link comprising:
capacitance means connected between the first and second input terminals of the inverter;
first controllable switching means for applying the DC voltage to the first input terminal of the inverter;
second and third serially-connected controllable switching means coupled in parallel with the series-connected capacitance means and said first controllable switching means;
inductive means connected between the first input terminal of said inverter and a terminal intermediate said second and third controllable switching means; and
control means for supplying signals to control said switching means in synchronism with the inverter switching devices such that the voltage across the first and second input terminals of the inverter is substantially at zero each time one of said switching devices changes state.

10. The DC link of claim 9 including a diode connected in parallel with said third controllable switching means, said diode being poled to conduct current in a direction opposite to current conducted in said third controllable switching means, said control means being operable to gate said second controllable switching means out of conduction while current is conducted in a path through said capacitance means and said inductive means so as to cause said current to transfer to said diode, said control means thereafter being operable to gate said third controllable switching means into conduction while current is conducted in said diode so as to effect substantially zero voltage switching of said third controllable switching means.

11. The DC link of claim 10 including a second diode connected in parallel with said first controllable switching means and poled to conduct current in a direction opposite to current in said first controllable switching means, said first controllable switching means being gated into conduction when voltage on said capacitance means is substantially equal to said DC voltage.

12. A method of operating a voltage source converter by supplying a sequence of gating control signals from a gate firing circuit, the converter being of the type having an inverter comprising a first plurality of semiconductor switching devices selectively switched into and out of conduction for converting a DC input voltage to a variable frequency pulsed output voltage and further including a DC link employing a second plurality of semiconductor switching devices for selectively controlling the DC voltage applied to the inverters, the second plurality of semiconductor switching devices including a first switching device serially connected between a source of DC voltage and the inverter, capacitance means connected between input terminals of the inverter, inductive means, a second switching device connected in a first series combination with said inductive means, said first series combination being connected in parallel with said capacitance means, a third switching device connected in a second series combination with said inductive means, said second series combination being connected in parallel with said first switching device, and a plurality of diodes, each of said first, second and third switching devices being connected in parallel with a corresponding one of said plurality of diodes, respectively, each of said diodes being oppositely poled with respect to its corresponding switching device, said method comprising the steps of:
gating the third switching device into conduction for charging the capacitance means to a voltage Ec1 substantially equal to a voltage Edc applied to the DC link;
gating the first switching device into conduction when the voltage Ec1 is substantially equal to the voltage Edc and thereafter gating the third switching device out of conduction such that current in the inductive means transfers to a current path through the diode in parallel with the second switching means;
gating the first switching device out of conduction prior to an anticipated time for commutating at least one of the switching devices in the inverter so that said inverter draws current from said capacitance means and thereby causes the voltage Ec1 to decay;
gating the second switching means into conduction to effect a pseudo-resonant decay of the voltage Ec1;
gating the second switching device out of conduction when the voltage Ec1 has decayed to substantially zero and current resulting from induced voltage across said inductive means continues to flow to force a current transfer into the diode connected in parallel with the third switching means;
commutating said at least one switching device in the inverter;
gating the third switching device into conduction to cause current flow in said inductive means and to recharge said capacitance means to the voltage Ec1; and
repeating each of the above steps for each commutation of a switching device in said inverter.

13. A method of operating a voltage source converter by supplying a sequence of gating control signals from a gate firing circuit, the converter being of the type having an inverter comprising a first plurality of semiconductor switching devices selectively switched into and out of conduction for converting a DC input voltage to a variable frequency pulsed output voltage and further including a DC link employing a second plurality of semiconductor switching devices for selectively controlling the DC voltage applied to the inverters, the second plurality of semiconductor switching devices including a first switching device serially connected between a source of DC voltage and the inverter, capacitance means connected between input terminals of the inverter, inductive means, a second switching device and a third switching device connected in a first series circuit with said inductive means, a first and a second capacitor serially connected between output terminals of the source of DC voltage, said second and third switching devices and said inductive means being serially connected between a junction intermediate said first and second capacitors and a junction intermediate said capacitance means and said first switching means, and a plurality of diodes, each of said first, second and third switching devices being connected in parallel with a corresponding one of said plurality of diodes, respectively, each of said diodes being oppositely poled with respect to its corresponding switching device, said method comprising the steps of:

gating the third switching device into conduction for charging the capacitance means to a voltage $E_{c1}$ substantially equal to a voltage $E_{dc}$ applied to the DC link;

gating the first switching device into conduction when the voltage $E_{c1}$ is substantially equal to the voltage $E_{dc}$ and allowing the third switching device to be naturally commutated by current reversal in the inductive means when the voltage $E_{c1}$ rises above the voltage at the junction intermediate said first and second capacitors;

gating the first switching device out of conduction prior to an anticipated time for commutating at least one of the switching devices in the inverter so that said inverter draws current from said capacitance means and thereby causes the voltage $E_{c1}$ to decay;

gating the second switching device into conduction to effect a pseudo-resonant decay of the voltage of $E_{c1}$, the second switching device being naturally commutated by current reversal in the inductive means when the voltage $E_{c1}$ falls below the voltage at the junction intermediate said first and second capacitors;

commutating said at least one switching device in the inverter;

gating the third switching device into conduction to cause current flow in said inductive means in a direction to recharge said capacitance means to the voltage $E_{c1}$; and repeating each of the above steps for each commutation of a switching device in said inverter.

14. The converter of claim 1 including first and second filter capacitors connected in series across said DC input power source, a diode, and third controllable switching means coupled in series with said diode between each of said filter capacitors and said inductive means and poled to conduct current in said inductive means to said capacitance means for recharging said capacitance means to a voltage level substantially equal to that of the DC input power source after commutation of said controllable switches in said inverter.

15. The converter of claim 14 wherein said current discharge path includes a second diode coupled in series between said second controllable switching means and each of said filter capacitors.

16. The converter of claim 15 wherein said second diode and said third controllable switching means are connected in parallel opposition.

* * * * *